UNITED STATES PATENT OFFICE.

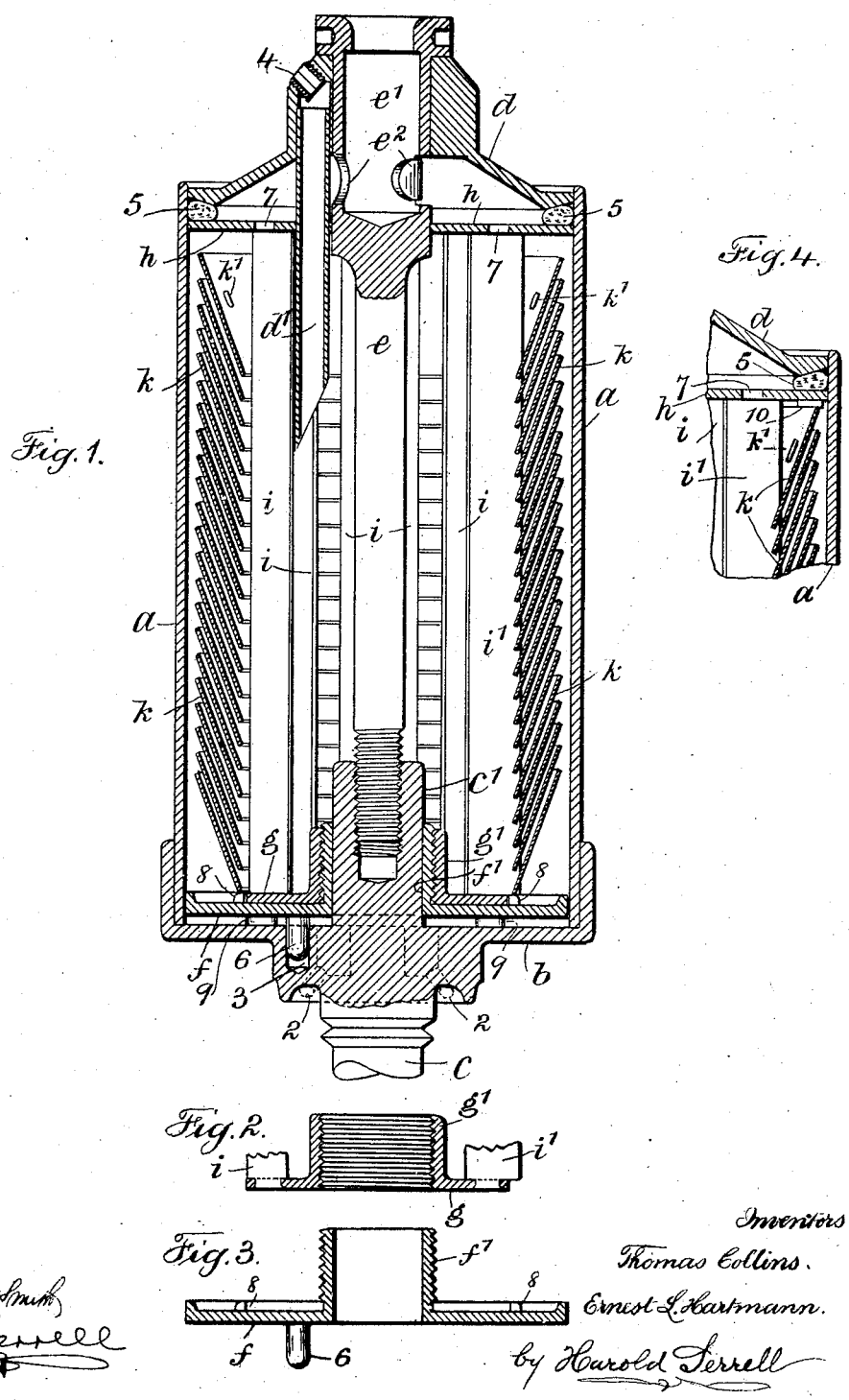

THOMAS COLLINS AND ERNEST LOUIS HARTMANN, OF BAINBRIDGE, NEW YORK, ASSIGNORS TO AMERICAN SEPARATOR COMPANY, OF BAINBRIDGE, NEW YORK, A CORPORATION OF NEW YORK.

CENTRIFUGAL LIQUID-SEPARATOR.

No. 919,131.      Specification of Letters Patent.      Patented April 20, 1909.

Application filed February 4, 1909. Serial No. 476,126.

*To all whom it may concern:*

Be it known that we, THOMAS COLLINS and ERNEST LOUIS HARTMANN, both citizens of the United States of America, residing at Bainbridge, in the county of Chenango and State of New York, have invented an Improvement in Centrifugal Liquid-Separators, of which the following is a specification.

Our invention relates to an improvement upon the device shown and described in our application for Letters Patent of the United States, filed August 6, 1908, Serial #447,276.

In the device of this application, the liner composed of series of circularly arranged bars and connected end disks and the loosely mounted nested liner plates or rings are removable as a unit from the bowl of the liner; the connected parts forming a rigid centering cage for the loosely mounted plates. Because of recognizing a call for this rigid centering cage and the removability of the parts as a unit from the bowl, together with the feature of removable and separate liner plates, we have devised the subject matter of this application.

In carrying out our invention, we still provide a rigid centering cage and the loosely mounted nested liner plates surround the bars thereof whereby a liner as a unit can be removed from the bowl of the separator for cleaning. The special features of our invention, however, relate to two superposed removably connected annulus disks, one of a diameter equal only to the over-all diameter of the circularly arranged bars and rigidly connected to the lower ends of said bars to form therewith and with the upper annulus disk, the rigid centering cage around which are the nested liner plates whose inner diameter is greater than that of this one of the lower annulus disks. The other lower annulus disk is of greater diameter; of substantially the diameter of the upper annulus disk, and when the disks are connected they serve to retain the nested liner plates in position. As a means of removably connecting these lower disks, we prefer to provide telescoping collars screwed together, which are respectively connected to said disks as will be hereinafter more fully described.

In the drawing, Figure 1 is a vertical section and partial elevation representing the device of our invention. Figs. 2 and 3 are cross sections of the lower annulus disks and their telescoping collars; Fig. 2 representing the smaller of the disks,—Fig. 3 the larger and lower of these disks, and Fig. 4 is a detailed view illustrating a modification of our invention.

Referring particularly to Fig. 1, $a$ represents the cylindrical bowl, $b$ the base of the bowl, $c$ the spindle, $c^1$ the interiorly threaded boss axially in line with the spindle and rising up within the bowl. Near the center of the base and around the spindle, ducts 2 are provided of any desired number and size for the delivery of the blue milk, and in the inner surface of the base $b$ is provided a recess 3.

$d$ represents the cover provided for the bowl, having a central aperture in which an adjustable cream plug 4 is suitably placed, and the cover is apertured below the cream plug to receive the cream tube $d^1$. At the pleasure of the manufacturer, this cream tube $d^1$ may be fastened to the cover or to a part of the cage hereinafter described. The cover fits within the upper end of the bowl and above a packing 5 and we employ a bolt $e$ which passes through the central aperture of the cover, down through the bowl and engages the interiorly threaded boss $c^1$; the bolt when the cover is in place securing it and the liner hereinafter described, in position within the bowl. The upper end of the bolt at $e^1$ is tubular and provided with oppositely disposed side discharge apertures $e^2$, and the milk to be treated is introduced into the centrifugal separator through the tubular upper end of the bolt and passes out into the separator through the side apertures $e^2$.

The liner comprises in part the top annulus disk $h$ provided with series of perforations 7 or milk holes.

The milk as discharged through the apertures $e^2$ falling on the top disk $h$ passes through the holes 7 to be acted upon for separation beneath the same.

$i$ represents a series of radially disposed bars which at their upper ends are securely riveted in their spaced apart relation to the top annulus disk $h$, and $k$ represents the series of superposed nested conical annulus plates or rings preferably provided with separating projections $k^1$ which maintain them at a predetermined distance from one another.

The special features of our invention relate to the two annulus disks and their telescoping collars at the lower portion of the centering cage. The first of these annulus disks is represented at $g$, and provided with an interiorly threaded collar $g^1$. This is the smaller of the disks and the lower ends of the series of radially disposed bars $i$ are riveted securely to this minor annulus disk $g$; the periphery of the disk $g$ coming to the outer edges of the bars $i$, or in other words, the extreme diameter of the disk $g$ is not greater than the over-all diameter of the series of radially disposed bars $i$; the top disk $h$, the series of bars $i$ and the minor annulus disk $g$ forming the rigidly connected series or centering cage.

$f$ represents the base annulus disk provided with a collar $f^1$ exteriorly threaded. From Fig. 1 it will be noticed that this collar $f^1$ is adapted to snugly fit and surround the boss $c^1$ of the bowl. It is provided with a pin 6 entering the recess 3 in the base of the bowl. It is of a diameter substantially the same as the top annulus disk $h$; these two disks passing snugly but with sufficient freedom into the bowl. The disk $f$ is preferably provided with a series of surface projections 8 which act as supports for the vertically arranged series of superposed nested annulus plates $k$. The collars $g^1$ $f^1$ of these disks are adapted to be screwed together as shown in Fig. 1, in which the upper surface of the disk $f$ and the under surface of the disk $g$ come forcibly together, and when in this position the nested annulus plates $k$ are retained between the upper disk $h$ and the lower disk $f$ and they, together with the parts forming the rigid centering cage, are removable from the bowl as a unit and may be maintained in this position if desired for cleansing. Should it happen that the operator using a bowl of this description, desires to separate the series of nested plates $k$ from the cage and from one another for any reason, this is readily accomplished by un-screwing the disk $f$ and its collar $f^1$ from the parts $h$, $i$ and $g$ $g^1$ forming the rigid centering cage, after which the nested annulus plates $k$ may be removed from the cage, separated, thoroughly cleaned and put back in position and the base disk $f$ and its collar again screwed to place, and the parts then connected as a unit returned to the bowl of the separator for further use.

Most of the parts hereinbefore described, and practically all of the parts except the base disk $f$ and its collar $f^1$ and the minor annulus disk $g$ and its collar $g^1$ are the same as shown and described in our hereinbefore mentioned application.

As in our aforesaid application, we prefer in the present structure to form one of the series of radially disposed bars, namely, a bar $i^1$ wider than the other bars and to notch the inner edges of the series of superposed liner plates to receive this widest of the radially disposed bars, in order to prevent the rotation around said series of bars of the nested liner plates.

As is usual in this class of centrifugal liquid separators and heretofore employed by us, we hold the liner in a slightly elevated position off the bottom of the bowl $b$ by projections 9 upon which the disk $f$ rests.

In the form of our invention shown in Fig. 4, and in view of the removability of the conical nested liner plates for cleansing, we are enabled to employ an additional liner plate, the upper edge of which comes closely adjacent to the under side of the upper disk member $h$ of the centering cage, and in this event we employ projections 10 from the under side of the member $h$ with which the upper edge of the upper liner plate comes into contact, so as to leave a space above said upper edge.

We claim as our invention:

1. In a centrifugal liquid separator, a series of parts rigidly connected and forming a centering cage, a series of loosely mounted nested conical liner plates surrounding the same and separable from one another and the centering cage, and a device adapted to be removably connected to one end of the centering cage for retaining the nested liner plates in position as a substantial unit with the centering cage.

2. In a centrifugal liquid separator, a series of parts rigidly connected and forming a centering cage, a series of loosely mounted nested conical liner plates surrounding the same and separable from one another and the centering cage, and a device adapted to be removably connected to the lower end of the centering cage for retaining the nested liner plates in position as a substantial unit with the centering cage.

3. In a centrifugal liquid separator, a liner comprising rigidly connected end and intermediate members, a series of loosely mounted nested conical liner plates or rings surrounding the intermediate members, adapted to come against one end member and to be removable from said parts over the other end member, and a device adapted for connection with the latter end member to extend over the said series of liner plates to hold the same in position as a unit with the other members comprising the liner.

4. In a centrifugal liquid separator, a liner comprising a top annulus disk, a series of circularly arranged spaced bars, a lower annulus disk with the respective ends of the bars connected rigidly to the said disks to form a centering cage, and the lower disk of substantially the same diameter as the over-all diameter of the said bars, a series of loosely mounted liner plates surrounding the said bars, movable lengthwise thereof, adapted to come against the upper disk and to pass over the lower disk, a disk adapted to come against the under surface of the said lower disk and which substantially equals in diameter the upper disk, and means for connecting the said lower disks together in a removable relation.

5. In a centrifugal liquid separator, a liner comprising a top annulus disk, a series of circularly arranged spaced bars, a lower annulus disk with the respective ends of the bars connected rigidly to the said disks to form a centering cage, and the lower disk of substantially the same diameter as the over-all diameter of the said bars, a series of loosely mounted liner plates surrounding the said bars, movable lengthwise thereof, adapted to come against the upper disk and to pass over the lower disk, a collar interiorly threaded and formed with and at the center of the latter disk, a disk of substantially the diameter of the upper disk, adapted to come against the surface of the aforesaid lower disk, a collar located at the center of this larger disk and exteriorly threaded and telescoping with the collar of the smaller disk, whereby the two disks are connected firmly and in a removable relation, the larger of said disks serving to retain the removable conical liner plates in position between the same and the upper disks of the liner.

6. In a centrifugal liquid separator, a series of parts rigidly connected and forming a centering cage, a series of nested conical liner plates surrounding the same and separable from the centering cage, and a device adapted to be removably connected to one end of the centering cage for retaining the nested liner plates in position as a substantial unit with the centering cage.

7. In a centrifugal liquid separator, a series of parts rightly connected and forming a centering cage, a series of nested conical liner plates surrounding the same and separable from the centering cage, and a device adapted to be removably connected to the lower end of the centering cage for retaining the nested liner plates in position as a substantial unit with the centering cage.

8. In a centrifugal liquid separator, a liner comprising a top annulus disk, a series of circularly arranged spaced bars, a lower annulus disk with the respective ends of the bars connected rigidly to the said disks to form a centering cage, and the lower disk of substantially the same diameter as the over-all diameter of the said bars, a series of liner plates surrounding the said bars and adapted to come against the upper disk and to pass over the lower disk, a member adapted to come against the under surface of the said lower disk and which substantially equals in diameter the upper disk, and means for connecting the said lower disk and member together in a removable relation.

Signed by us this 28th day of Jan., 1909.
THOMAS COLLINS.
ERNEST LOUIS HARTMANN.
Witnesses:
    LELAND VAN ETTEN,
    EARL A. WESTCOTT.